United States Patent [19]

Toide et al.

[11] Patent Number: 5,540,967
[45] Date of Patent: Jul. 30, 1996

[54] OPTICAL DISC

[75] Inventors: Yukari Toide; Kazuhiko Tsutsumi; Motohisa Taguchi; Kazuo Kuramoto; Masaru Tsuchihashi, all of Amagasaki, Japan

[73] Assignee: Mitsubishi Denki Kabushiki Kaisha, Tokyo, Japan

[21] Appl. No.: 320,571

[22] Filed: Oct. 11, 1994

Related U.S. Application Data

[63] Continuation of Ser. No. 496,422, Mar. 20, 1990, abandoned.

[30] Foreign Application Priority Data

| Mar. 27, 1989 | [JP] | Japan | 1-75731 |
| Jul. 14, 1989 | [JP] | Japan | 1-183215 |
| Jul. 25, 1989 | [JP] | Japan | 1-193547 |
| Oct. 24, 1989 | [JP] | Japan | 1-277511 |
| Jan. 22, 1990 | [JP] | Japan | 2-12834 |

[51] Int. Cl.$^6$ .................. B32B 3/02; G11B 5/66
[52] U.S. Cl. ............ 428/64.4; 428/65.1; 428/65.2; 428/694 ML; 428/694 MM; 428/694 PR; 428/900; 430/272.1; 522/14; 522/170; 369/284
[58] Field of Search .......... 428/900, 694 ML, 428/694 MM, 694 PR, 64.4, 65.1, 65.2; 430/272; 369/284; 522/14, 170

[56] References Cited

U.S. PATENT DOCUMENTS

| 4,113,684 | 9/1978 | Petrie | 523/404 |
| 4,222,070 | 9/1980 | Howe et al. | 358/342 |
| 4,711,798 | 12/1987 | Veda et al. | 428/64.8 |
| 4,740,947 | 4/1988 | Ohta et al. | 369/286 |
| 4,865,949 | 9/1989 | Yamamuro et al. | 430/270.18 |

FOREIGN PATENT DOCUMENTS

| 0268352 | 8/1987 | European Pat. Off. . |
| 0278763 | 2/1988 | European Pat. Off. . |
| 0285112 | 3/1988 | European Pat. Off. . |
| 0301830 | 7/1988 | European Pat. Off. . |
| 61-068744 | 4/1986 | Japan . |

OTHER PUBLICATIONS

May, Epoxy Resins: Chemistry and Technology, 2nd ed. pp. 683–687; 1988.
Skeist, *Epoxy Resins*, 1958.
Skeist, Handbook of Adhesives, 3rd ed., 1990.

*Primary Examiner*—Leszek Kiliman
*Attorney, Agent, or Firm*—Harold Burstyn; Alfred W. Froebrich; Thomas R. Morrison

[57] ABSTRACT

An optical disc comprises two facing disc units, at least one of which has a recording layer formed on its surface facing to the other disc unit. The disc units are bonded together by a layer of adhesive which may be a room-temperature curing thermosetting adhesive having a glass transition temperature higher than the upper limit of the range of temperatures of environments in which the disc may be used. Alternatively, the adhesive may be a room-temperature curing two-pack epoxy adhesive which comprises a bisphenol epoxy resin base agent and a modified aliphatic polyamine curing agent, and which has a viscosity of 100–1000 cps, a pot life of one hour or more, a cure shrinkage of 1.0% or less, a water absorption, after curing, of 0.2% or less, and a Shore hardness, after curing, of 80–90.

7 Claims, 9 Drawing Sheets

OPTICAL DISC

This application is a continuation of application Ser. No. 07/496,422, filed Mar. 20, 1990, now being abandoned.

This invention relates to an optical disc, and, more particularly to an erasable optical disc, which may be used as, for example, an external device of computers. This invention relates also to a method and apparatus for manufacturing such optical discs.

BACKGROUND OF THE INVENTION

Figure 1:
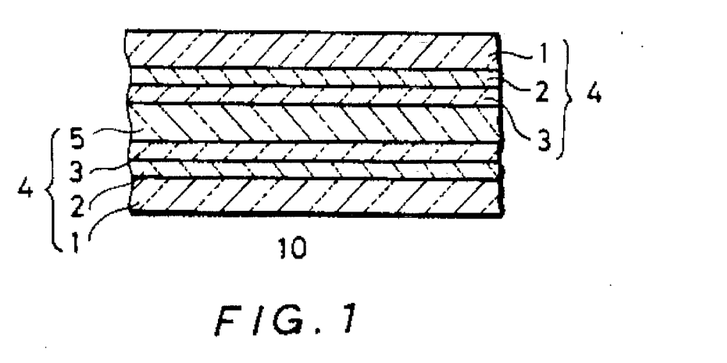
FIG. 1 is a cross-sectional view of a portion of a common optical disc.

FIG. 1 shows a cross-section of an ordinary optical disc, designated as 10. A recording layer 2 is formed on a transparent substrate 1 of resin, such as, for example, polycarbonate, and a protective film 3 is formed over the recording layer 2. The substrate 1, the layer 2 and the film 3 form a disc unit 4. Two such disc units 4 are bonded to each other at the exposed surfaces of the respective protective films 3 with an adhesive layer 5. Thus, the optical disc 10 is formed. Conventionally, in order to bond the disc units 4 together, a thermosetting adhesive, an ultraviolet-curable adhesive, or a thermoplastic adhesive are used. A corrosive component contained in such adhesives, however, tends to degrade the recording layers 2, and, in particular, when the water absorption of the adhesive layer 5 is high, the protective films 3 and the recording layers 2 are oxidized, which lowers the reliability of the disc 10. A moisture-curing adhesive, such as one-pack epoxy resin adhesive, may be used. However, when disc units having large areas are bonded with a thin layer of a moisture-curing adhesive, air or moisture hardly penetrates to reach center portions of the bonded disc units, resulting in incomplete curing of the adhesive. Furthermore, bonding disc units with such an adhesive requires a long time and is difficult to do. When two-pack non-mixing type resins and microcapsule type resins are used, some components may remain uncured, which will erode the discs. Furthermore, such adhesives can provide insufficient adhesion. For such reasons, two-pack non-mixing type and microcapsule type adhesives are considered unsuitable for bonding disc units.

Another problem which may be encountered when curing type adhesives are used is that contraction of the curing adhesive may cause distortion of the disc units. In particular, when a thermosetting adhesive is used, not only does contraction of the adhesive occur when it cures, but also heat applied for curing the adhesive distorts the adhesive layer 5 itself. Distortion of the adhesive layer 5 causes deformation or warpage of the disc units, and, therefore, resulting optical discs may have to be rejected.

The use of a thermoplastic resin adhesive rather than a thermosetting resin as the adhesive layer 5 is disclosed in, for example, Japanese Patent Publication No. SHO 63-67258. In the invention disclosed in this patent publication, a hot-melt type adhesive, which is thermoplastic, is used for the adhesive layer 5. A hot-melt adhesive which has been heated and melted is applied over the protective film 3 of a first disc unit 4. Then, the other disc unit 4 is placed on the first disc unit 4 in such a manner that the protective film 3 of the other disc unit 4 comes into contact with the adhesive which has been applied over the protective film 3 of the said first disc unit 4. Then, the assembly is cooled to room temperature so that the hot-melt adhesive cures to bond the two disc units 4 to each other.

Since such a thermoplastic resin adhesive need not be heated for its curing, distortion of the adhesive layer 5 is small, which, in turn, can advantageously reduce warpage of the disc units 4. However, if the adhesive is applied non-uniformly, portions of the adhesive layer 5 may swell from to moisture which penetrates through the substrate 1, and the disc units may crack or may separate from each other.

Usually, optical discs are used in different environments, from cold districts to hot districts, and, accordingly, the temperature at which discs are designed to perform desired functions (hereinafter this temperature is referred to as usable environment temperature) ranges, for example, from −20° C., to 60° C. The inventors have conducted humidity-resistance tests and temperature-humidity cycle tests on optical discs comprising two disc units 4 bonded together with a hot-melt adhesive at the above-stated temperature range of from −20° C. to 60° C. at which discs may be used. They found that the recording layers 2 were readily peeled off, pin holes were produced and, when the number of test cycles increased, bit error rates increased abruptly. Therefore they concluded that such optical discs were not sufficiently reliable.

One conventional technique for bonding two disc units 4 together is as follows. A first disc unit 4 is positioned with the recording layer 2 facing upward. An adhesive is applied over the protective film 3 on the recording layer 2 in generally concentric circles. A second disc unit 4 is aligned with the first disc by means of a center shaft of a disc manufacturing apparatus, and the protective film 3 of the second disc unit is brought into contact with the adhesive. The resultant assembly is left as it is so that the the adhesive is spread over the entire surfaces of the protective films due to the weight of the disc unit, and the adhesive is caused to cure to bond the two disc units together. In this bonding technique, bubbles may be disadvantageously formed in the adhesive when it is applied over the protective film or when the second disc unit is brought into contact with the adhesive on the protective film of the first disc unit, and the bubbles may remain after the adhesive cures.

One method for preventing such bubbles from being formed in the adhesive layer is shown in Japanese Unexamined Patent Publication No. SHO 61-50231. According to the method shown in this patent publication, an adhesive is applied over the entire surface of the protective film 3 by spin-coating, and the two disc units are bonded together with their center axes aligned with each other. According to another method which is shown in Japanese Unexamined Patent Publication No. SHO 61-292244, an adhesive is applied over portions of the protective film 3 of one disc unit, the other disc unit is placed over the first disc unit with the center axes of the two disc units aligned, and pressure is applied to bond the two disc units together with the adhesive spread over the entire surfaces of the protective films.

Figures 2A, 2B:
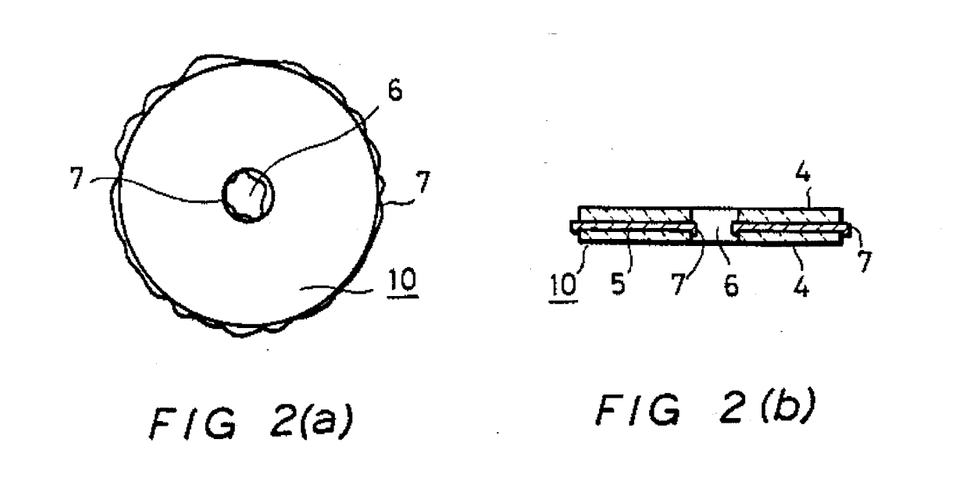
FIGS. 2(a) and 2(b) are plan and cross-sectional views, respectively, of an optical disc comprising two disc units bonded with a low-viscosity adhesive according to a conventional technique.

When an adhesive is applied over the entire surface of the protective film 3 of one disc unit 4 and the other disc unit is bonded to the first disc unit, the adhesive may forced out into the center holes of the disc units and also around the bonded disc units, and, when the adhesive cures, burrs 7 may be formed on the periphery of the center hole 6 of the optical disc 10 and on the periphery of the disc 10, as shown in FIGS. 2(a) and 2(b). Burrs 7 formed within the center hole 6 could make the disc 10 eccentric, and, accordingly, they should be completely removed. In order to deburr, a deburring device, such as one shown in Japanese Unexamined Patent Publication No. SHO 61-80534, may be used. However, the use of a deburring device will undesirably increase the number of manufacturing steps, which, in turn, increases the manufacturing costs. On the other hand, even when the adhesive is applied over portions of the protective film, it may be forced out or ooze out as in the case when the adhesive is applied over the entire surface as stated above, or, sometimes, the distribution of the adhesive may be non-uniform, so that the disc 10 may flutter.

Figures 3A, 3B:
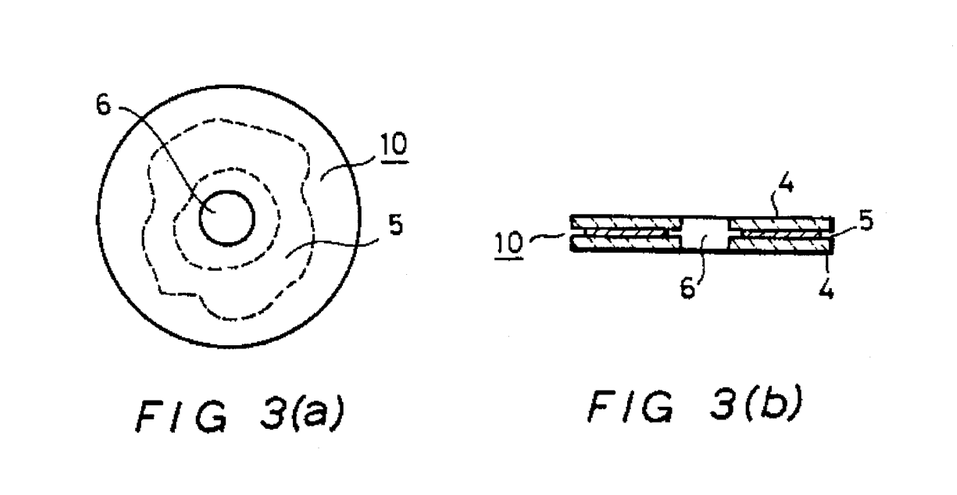
FIGS. 3(a) and 3(b) are plan and cross-sectional views, respectively, of an optical disc comprising two disc units bonded with a high-viscosity adhesive according to a conventional technique.

In order to prevent the adhesive from oozing out into the center hole or out of the periphery of the disc, a precisely adjusted pressure must be applied, which requires high-precision, expensive equipment. One of the simplest techniques for bonding two disc units is the use of the weight of a disc unit itself with an adhesive placed between the two disc units. In this technique, however, if an adhesive having a viscosity of less than 100 cps is used, it may ooze out and form burrs 7 like the ones shown in FIGS. 2(a) and 2(b). In contrast, if the viscosity of the adhesive is above 1000 cps, the adhesive may not spread over the entire space between the two disc units 4, as shown in FIGS. 3(a) and 3(b). Even if the amount of the adhesive to be applied is precisely measured, oozing out of the adhesive as shown in FIGS. 2(a) and 2(b) or absence of the adhesive at some portions as shown in FIGS. 3(a) and 3(b) may occur if the adhesive is applied to disc units at inappropriate positions.

Figure 4:
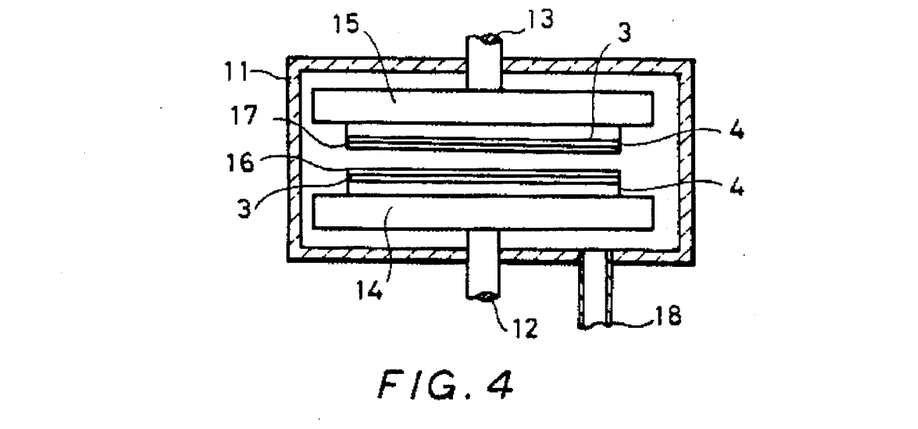
FIG. 4 is a cross-sectional view of a conventional reduced-pressure bonding apparatus for bonding two disc units.

A reduced-pressure bonding apparatus as shown in FIG. 4 has been conventionally used for bonding, with an adhesive, two disc units without leaving bubbles in the adhesive layer. In FIG. 4, a vacuum chamber 11 houses mounts 14 and 15 coupled respectively to shafts 12 and 13 which can move up and down. Disc units 4 with adhesive layers 16 and 17 applied over the surfaces of protective films 3 of the respective disc units 4 are mounted on the mounts 14 and 15, respectively. A vacuum pump (not shown) is operated to reduce the pressure in the vacuum chamber 11 through an exhaust pipe 18 to a pressure of about 20 Torr or less. Then, the shafts 12 and 13 move the mounts 12 and 13 toward each other for bonding the disc units 4 together. The adhesive may be cured under a reduced pressure or under normal pressure, but the pressure under which the bonding of disc units is carried out must be about 20 Torr or below. When the pressure is higher than that, bubbles may in the adhesive.

When the reduced-pressure bonding apparatus of FIG. 4 is used, the adhesive is applied to at least portions of the protective films 3 of the disc units 4, and the disc units 4 are bonded with the adhesive which is spread over the entire surfaces of the films 3 due to application of pressure. It is, therefore, necessary to control precisely the movement of the shafts 12 and 13 in order to prevent the adhesive from oozing out into the center hole or to the outer periphery of the disc or from being non-uniformly distributed. Furthermore, it is necessary to determine precisely the amount of adhesive to be applied and also the position where the adhesive is to be applied. In addition, it is also necessary to maintain the pressure in the reduced-pressure bonding apparatus at about 20 Torr or below. If one wants to use this type of apparatus for mass-production of optical discs, the size of the apparatus must be large.

Therefore, a first object of the present invention is to produce optical discs which are free of warpage of the discs and peeling off of a recording layer of the discs when they are used at a usable environment temperature within a range of, for example, from −20° C. to 60° C.

A second object of the present invention is to produce, at low costs, highly reliable optical discs in which degradation of recording layers and deformation of disc units are eliminated by the use of an adhesive that can reduce the number of discs rejected in the step of bonding two disc units.

A third object of this invention is to provide an improved method of manufacturing optical discs, according to which, when two disc units are bonded together with an adhesive, the adhesive does not ooze out into the center hole or to the outer periphery of a resulting disc, and, accordingly, a step for removing burrs can be eliminated. The resulting optical discs are free of eccentricity and free of surface fluttering.

SUMMARY OF THE INVENTION

In a first example of an optical disc according to the present invention, the optical disc comprises two disc units facing each other, at least one of which has a recording layer formed on the surface facing the other disc unit. The two disc units are bonded together by means of an adhesive layer which is disposed between the facing surfaces and which comprises a thermosetting resin that has a glass transition temperature higher than the highest usable environment temperature of the optical disc and that cures at room temperature.

In a second example of an optical disc according to the present invention, two disc units, each comprising a transparent substrate and a recording layer formed on one surface of the substrate, are disposed with the recording layers facing each other, and the disc units are bonded together by means of an adhesive layer interposed between the recording layers. The adhesive layer is formed by curing a room-temperature curable two-pack epoxy adhesive which comprises a bisphenol epoxy resin as a base agent and a modified aliphatic polyamine as a curing agent, and which has a viscosity of 100–1000 cps, a pot life of one hour or more, and a cure shrinkage of the adhesive of 1.0% or less. The adhesive, when cured, has a water absorption of 0.2% or less, and has a Shore hardness of 80–90 (D scale).

For example, the bisphenol epoxy resin of A-type or F-type may be advantageously used. The modified aliphatic polyamine having a viscosity of, for example, 100 cps or less may be advantageously used.

According to one aspect of the method of manufacturing optical discs of the present invention, an adhesive, which forms the adhesive layer of the above-described first and second examples, is applied to a surface of one of two disc units along the circumference of one or more circles about the center of the disc unit having a radius of from 0.5a to 0.85a, where a is the radius of the disc unit, and then the two disc units are bonded together.

A second example of the method of manufacturing optical discs of the present invention comprises the steps of: applying an adhesive to the surface of the first of two disc units to be bonded together which faces the second disc unit; placing the second disc unit slantwise with one end of a diameter of the second disc unit abutting one end of a diameter of the first disc unit; supporting the first and second disc units by means of a center shaft of a base; holding the second disc unit at the other end of the said diameter, while maintaining the second disc slanting with respect to the first disc unit, by holding means extending from driving means mounted on an axis which is substantially in parallel with the line connecting the respective other ends of the diameters of the first and second disc units; moving the driving means downwardly to bring the two disc units into contact with each other in such a manner that portions of the disc units near to the said one ends of the diameters first contact with each other and portions of the disc units near to the other ends contact with each other last; and curing the adhesive to bond the disc units together.

In each of the examples of the method of manufacturing optical discs described above, the adhesive used in the previously described first and second examples of optical discs may be used.

An optical disc manufacturing apparatus of the present invention includes a center shaft mounted on a base for supporting two disc units, holding means for holding one end of a diameter of one of the two disc units in such a manner that the one disc unit is slanting with respect to the other disc unit, driving means supporting the holding means and movable up and down at an adjustable speed, and angle adjusting means for adjusting the slanting angle of the driving means in accordance with the angle of the one disc unit relative to the other disc unit.

BRIEF DESCRIPTION OF THE INVENTION

In the accompanying drawings.

DETAILED DESCRIPTION OF THE INVENTION

The present invention is described in detail with reference to the accompanying drawings.

Figure 5:
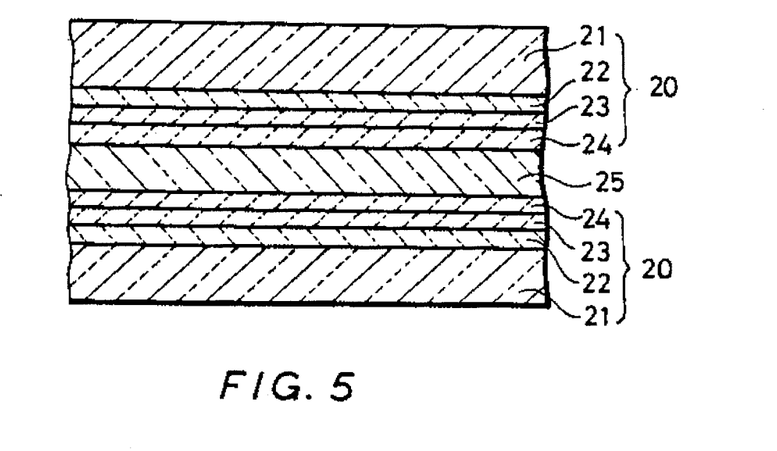
FIG. 5 is a cross-sectional view of a portion of an optical disc according to one embodiment of the present invention.

As shown in FIG. 5, an optical disc according to the present invention may be manufactured in the following manner. A layer 22 of dielectric material, such as silicon nitride ($SiN_x$), is formed over a surface, in which grooves may be formed, of a transparent substrate 21 of synthetic resin, such as polycarbonate, having a glass transition temperature of, for example, 130° C. Then, over this dielectric layer 22, a recording layer 23 is formed. The recording layer 23 may comprise an amorphous magnetic material having perpendicular magnetic anisotropy, such as terbium-iron-cobalt (Tb—Fe—Co). A protective film 24 of, for example, silicon nitride ($SiN_x$) is formed over the recording layer 23 to complete a disc unit 20. Two such disc units 20 are bonded together, with their respective protective films 24 facing each other, with an adhesive layer 25 interposed between them. The basic structure of this optical disc is substantially the same as that of conventional ones. The optical disc of the present invention is characterized by the material of the adhesive layer 25.

According to the present invention, the adhesive layer 25 comprises a thermosetting adhesive which has a glass transition temperature higher than the upper limit of the usable environment temperature range of, for example, from −20° C. to 60° C., of the disc, and which can cure at room temperature. An example of adhesive usable in the present invention is a two-pack room-temperature curable epoxy adhesive which comprises a bisphenol epoxy resin, as a base, and a modified aliphatic polyamine, as a curing agent, has a viscosity of from 100 to 1000 cps, and has a pot life of one hour or longer. This adhesive can cure at room temperature and has a glass transition temperature of about 70° C., and, therefore, it can satisfy the above-described conditions. The above-described two-pack epoxy adhesive has to have a cure shrinkage of 1.0% or less, a water absorption of 0.2% or less, and a Shore hardness of from 80 to 90 (D scale), after it cures.

Another example of usable adhesive is a two-pack room-temperature curable epoxy adhesive which comprises a bisphenol epoxy resin, as its base, and a modified aliphatic polyamine, as the curing agent, having a viscosity of 100 cps or less at room temperature. This adhesive has a viscosity of 100–1000 cps and a pot life of one hour or longer, and can be cured at room temperature. Like the first described example, this adhesive should have a cure shrinkage of 1.0% or less, a water absorption of 0.2% or less, and a Shore hardness of 80–90 (D scale).

Bisphenol epoxy resins usable as the base agent of the adhesives of the present invention are a bisphenol A epoxy resin (commercially available as TB2022 (trade name) from Three Bond Co., Ltd. Hachioji-shi, Tokyo, Japan), and a bisphenol F epoxy resin (commercially available as TB2023 from Three Bond Co., Ltd.). Experiments have revealed that two-pack epoxy adhesives other than the above-described ones and one-pack epoxy adhesives cause the recording layers to be oxidized and degraded due to corrosive components contained in such adhesives.

In some applications, adhesives to be used for manufacturing optical discs of the present invention may be selected from the viewpoint of glass transition temperature and warpage of substrates or disc units.

EXAMPLE 1

Figure 6:
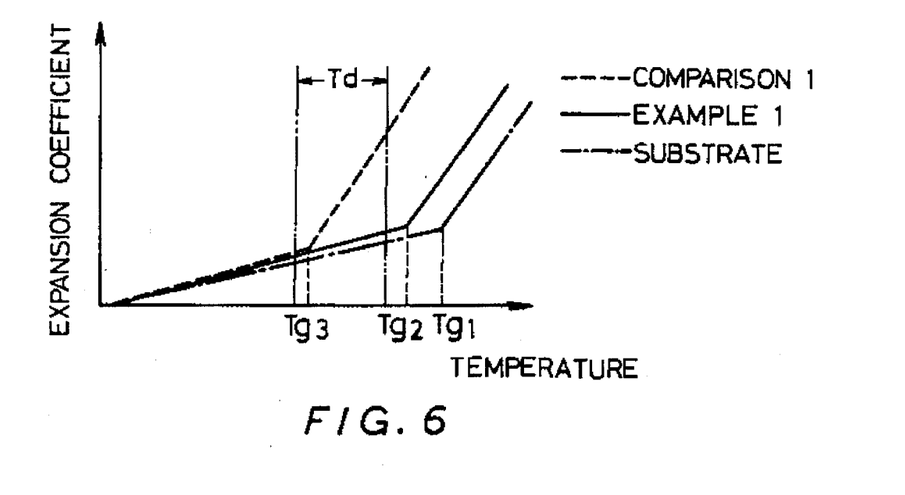
FIG. 6 shows expansion coefficients of an adhesive layer of the present invention and a substrate, together with an expansion coefficient of a conventional adhesive layer, in relation to temperature.

The adhesive layer 25 comprises a two-pack epoxy adhesive comprising a mixture of a bisphenol A epoxy base agent (available as TB2022 from Three Bond Co., Ltd.) and a modified aliphatic polyamine curing agent (available as TB2131D from Three Bond Co. Ltd.) which are mixed in a ratio of 3:1. The mixture is then deaerated. This adhesive can cure at room temperature, and it has a glass transition temperature of about 70° C., As indicated by a solid line in FIG. 6, the adhesive has a thermal expansion coefficient substantially the same as that of the polycarbonate substrate 21 indicated by a dash-and-dot line, in the temperature range below the glass transition temperature ($T_{g2}$) of the adhesive. The polycarbonate substrate 21 has a glass transition temperature $T_{g1}$.

Since the adhesive of Example 1 could cure and form the adhesive layer 25 at room temperature, distortion of the layer produced when the adhesive cures was small, and the amount of warpage of the substrates 21 measured in terms of tilt angle after the two disc units were bonded together was 1.5 mrad, which was small relative to the values for Comparisons 1, 2 and 3 described later. Incidentally, a tilt angle is the angle of tilt of the normal to a surface of a disc with respect to the axis of rotation of the disc and can be a measure of the amount of warpage of the disc.

Optical discs having a similar structure to the disc of Comparison 1 and comprising two disc units 20 bonded together by the above-described adhesive were placed in a thermo-hygrostat whose temperature and relative humidity (RH) were held at 60° C. and 90%, respectively, for 100 hours to test their humidity resistance, and the tilt angle was measured. The measured tilt angle was 1.6 mrad, which was only slightly different from the tilt angle measured before the test. Furthermore, this value was smaller than the tilt angles of Comparisons 1, 2 and 3, described later, measured immediately after the bonding. The optical discs of Example 1 were also subjected to composite temperature/humidity cyclic tests according to JIS-C5024 Procedure I (in which the temperature was between −10° C. and 65° C. and thirty test cycles were performed). (As for the JIS-C5024, Procedure I composite temperature/humidity cyclic test, see IEC 68-2-38 Basic Environmental Testing Procedures, Part 2.)

After the tests, the recording characteristics of the optical discs were measured. As indicated by a solid line a in FIG. 7, substantially no increase in bit error rate from the initial value was observed, which means that the optical discs of Example 1 are highly reliable.

EXAMPLE 2

The adhesive layer 25 of Example 2 comprises a mixture of the same bisphenol A epoxy base agent as in Example 1 (available as TB2022 from Three Bond Co., Ltd.) and a modified alicyclic polyamine curing agent in a ratio of 2:1. This adhesive has a glass transition temperature of 90° C. and cures at room temperature.

The tilt angles of optical discs measured immediately after two disc units 20 were bonded together with the adhesive of Example 2 was 1.4 mrad, which was small relative to that of the later-mentioned Comparisons 1–3. The tilt angles indicative of the amounts of warpage measured after the discs were subjected to humidity resistance tests was 1.8 mrad which was also smaller than the tilt angles of the discs of Comparisons 1–3 measured immediately after the bonding. Furthermore, the recording characteristics of the optical discs employing the adhesive of Example 2 measured after temperature/humidity cycle tests were also good.

EXAMPLE 3

The adhesive layer 25 used in this example is an acrylic ultraviolet-curing resin (commercially available, as TB3033, from Three Bond Co., Ltd.) which has a glass transition temperature of 80° C. and cures at room temperature.

The tilt angle of the disc measured immediately after two disc units were bonded together with the adhesive of Example 3 was 1.7 mrad, which was small relative to those of Comparisons 1–3. The tilt angle of the discs measured after humidity resistance tests was 1.9 mrad which was also smaller than those of Comparisons 1–3 measured immediately after the bonding. Further, the recording characteristics of the optical discs employing the adhesive of Example 3 measured after temperature/humidity cyclic tests were also good.

EXAMPLE 4

The adhesive forming the adhesive layer 25 of this example is a two-pack epoxy adhesive which comprises a base agent (TB2022C available from Three Bond Co., Ltd.) comprising a bisphenol A epoxy resin to which a reactive diluent having an epoxy group is added, and a modified aliphatic polyamine curing agent (TB2131D available also from Three Bond Co., Ltd.), mixed in a ratio of 3:1. The adhesive of Example 4 has a glass transition temperature of 60° C. and cures at room temperature.

The tilt angle of optical discs employing the adhesive of Example 4 measured after two disc units were bonded was 2.0 mrad. This value is as small as that of Comparison 1 which was the smallest of the three Comparisons. The amount of warpage of the optical discs of this Example slightly increased after they were subjected to humidity resistance tests, but such an increase was practically negligible. A dash-and-dot line c in FIG. 7 indicates the bit error rates measured for the optical discs of Example 4 after respective cycles of temperature/humidity cyclic tests. As is seen, the bit error rate remained substantially the same as the initial value when the discs were subjected to twenty or less test cycles. This means that the optical discs of Example 4 have sufficient durability and reliability. The bit error rate begins to increase more or less when the discs are subjected to thirty cycles of the test, but is still practically negligible.

In order to demonstrate the advantageous features of the adhesives used in accordance with the present invention, various characteristics of optical discs using conventionally used adhesives are described hereinafter.

COMPARISON 1

In Comparison 1, the adhesive used for forming an optical disc adhesive layer 25 is a hot-melt adhesive which has a glass transition temperature of 5° C. and cures at room temperature.

Figure 7:
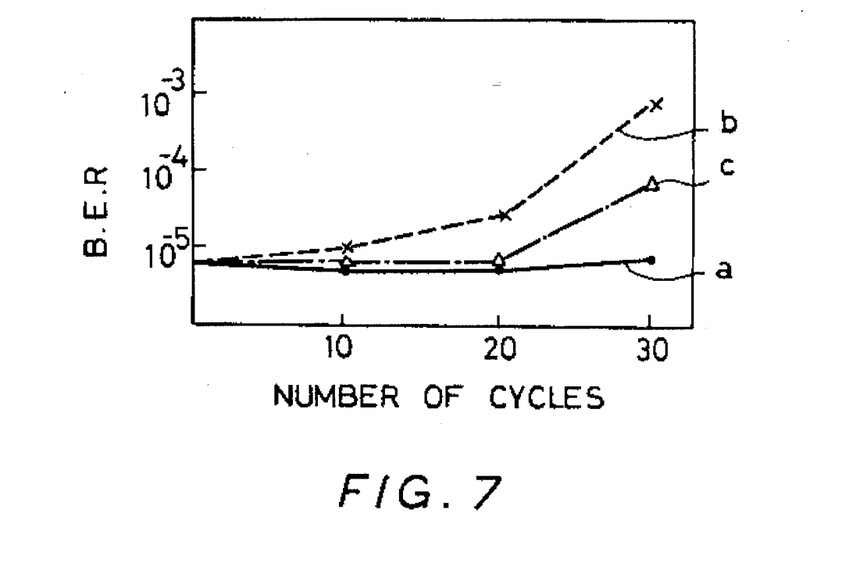
FIG. 7 shows bit error rates of optical discs which are manufactured using adhesives of the present invention and conventional adhesives, to illustrate how bit error rates change with the number of cycles in composite temperature/humidity cyclic tests conducted according to JIS-C5024, Procedure I.

The tilt angle of discs of Comparison 1 measured after two disc units were bonded together was 2.0 mrad, which was small enough. However, the tilt angle of substrates 21 increased considerably to 21.5 mrad, after the discs were subjected to humidity resistance tests in which the discs were placed within a thermo-hygrostat of 60° C. and 90% RH for 100 hours. It is understood that the discs were not usable. The discs of Comparison 1 were also subjected to composite temperature/humidity cyclic tests according to JIS-C5024 Procedure I (temperature ranging from −10° C. to 65° C., the number of test cycles being 30 cycles). As is shown in FIG. 7, by a broken line b, the bit error rates of the discs after the cycle tests were relatively high, and, in particular, when the discs were subjected to 20 or more cycles of tests, the bit error rate increased sharply, which means that the discs of Comparison 1 are not sufficiently reliable.

COMPARISON 2

The adhesive of the adhesive layer 25 of optical discs of Comparison 2 comprises a mixture of a bisphenol A epoxy resin (Epicoat 828 commercially available from Shell Chemical, Co.), as a base agent, and a curing agent comprising polythiol. They are mixed in a ratio of 1:1. This adhesive has a glass transition temperature of 50° C. and cures at room temperature.

The tilt angle of the optical discs of Comparison 2 measured after two disc units were bonded together was 2.4 mrad, which was small and desirable. However, the tilt angle of substrates 21 increased to 17.2 mrad after the discs were subjected to humidity resistance tests similar to those conducted for Comparison 1, and the bit error rate rapidly increased after the discs were subjected to temperature/humidity cyclic tests. That is, the optical discs of Comparison 2 were neither durable nor reliable.

COMPARISON 3

The adhesive of the adhesive layer 25 of optical discs comprises a mixture of a base agent which is a bisphenol A epoxy resin (Epicoat 828) and an imidazole compound. They are mixed in a ratio of 100:2. This adhesive is heated to 80° C. for curing. The glass transition temperature is 130° C.

The tilt angle of the discs of Comparison 3 measured after two disc units were bonded together with the adhesive was 10.3 mrad, which is too large for practically usable optical discs.

Data concerning Examples 1–4 of the present invention and Comparisons 1–3 are shown in the following Table.

TABLE

|  | Glass Transition Temperature (°C.) | Tilt Angle After Bonding (mrad) | Tilt Angle After Subjecting To 60° C., 90% RH For 100 Hours | Recording Characteristics After Temp./ Hum. Cyclic Tests | Curing Temperature |
| --- | --- | --- | --- | --- | --- |
| Example 1 | 70 | 1.5 (good) | 1.6 (good) | (good) | room temperature |
| Example 2 | 90 | 1.4 (good) | 1.8 (good) | (good) | room temperature |
| Example 3 | 80 | 1.7 (good) | 1.9 (good) | (good) | room temperature |
| Example 4 | 60 | 2.0 (good) | 2.6 (rather good) | (rather good) | room temperature |
| Comparison 1 | 5 | 2.0 (good) | 21.5 (bad) | (bad) | room temperature |
| Comparison 2 | 50 | 2.4 (good) | 17.2 (bad) | (bad) | room temperature |
| Comparison 3 | 130 | 10.3 (bad) | — | — | 80° C. |

As is seen from this Table, all of the adhesives of the present invention forming the adhesive layers 25 disposed between two disc units of optical discs have a glass transition temperature ($_{g2}$) higher than the upper limit (60° C.) of the usable environment temperature range $T_d$ and are curable at room temperature. Further, when they are used at a temperature within the usable environment temperature range $T_d$, the warpage of the substrates 21 is small and has sufficient durability and reliability.

The reasons why such good results can be obtained are considered to be as follows. As is shown by the temperature-linear expansion coefficient characteristic in FIG. 6, the glass transition temperatures ($T_{g2}$) of the adhesives of the Examples are higher than the upper limit (60° C.) of the usable environment temperature range ($T_d$), and, therefore, the linear expansion coefficients of the substrates 21 and the adhesive layers 25 are substantially equal to each other in environments where the discs are normally used. Accordingly, even if large temperature changes occur, the adhesive layers are not distorted and, accordingly, neither warping of the discs nor peeling off of the recording layers 23 occurs. When an adhesive such as the one of Comparison 1 which has a glass transition temperature $T_{g3}$ that is lower than the upper limit (60° C.) of the usable environment temperature range $T_d$ is used, the linear expansion coefficient of the adhesive become greatly different from that of the substrates even in the temperature range $T_d$, which may cause discs to warp or may cause the recording layers to be peeled off.

Because water absorption of adhesives of resins is very high at temperatures above the glass transition temperature, the adhesives of Comparisons 1 and 2, whose glass transition temperatures are low, absorb moisture even within the temperature range $T_d$. Water absorbed in the adhesives accelerates warping and corrosion of optical discs, which causes bit error rates to greatly increase. These are the reasons why the optical discs with the adhesives having a glass transition temperature higher than the upper limit (60° C.) of the usable environment temperature range can produce good results.

The adhesive of Comparison 3 has a high glass transition temperature of 130° C. However, since this adhesive needs to be heated to cure, the adhesive layer 25 is distorted while it is curing and, therefore, optical discs using this adhesive greatly warp. Thus, adhesives like the one of Comparison 3 are not suitable for use in optical discs.

In some applications, adhesives may be chosen from the viewpoint of corrosion, warpage and the number of swells of discs caused by adhesives used, distribution of applied adhesives, etc.

Figure 8:
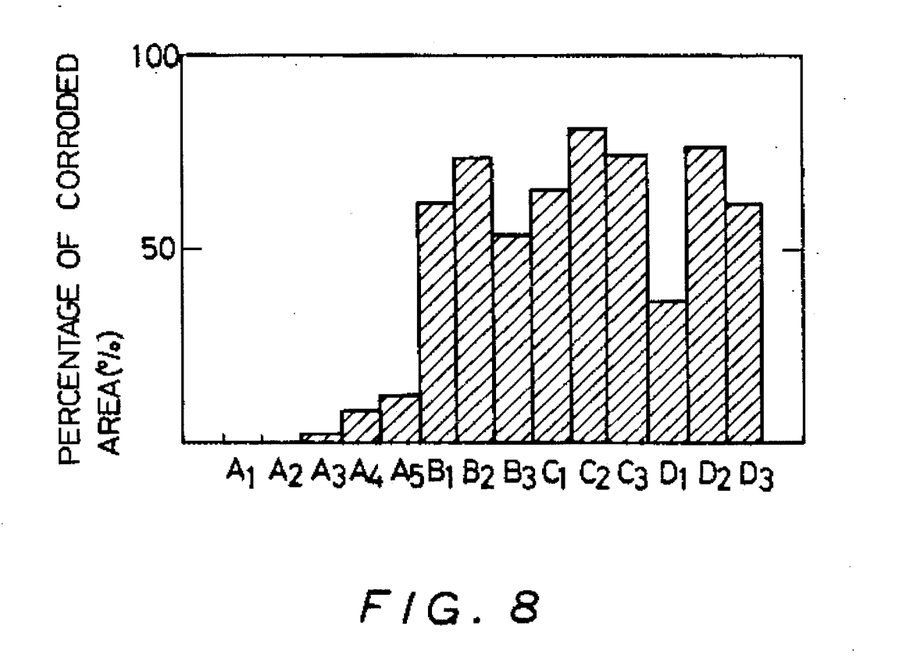
FIG. 8 shows how much corrosion occurs in optical discs of the present invention and in conventional optical discs.

FIG. 8 shows corrosion of optical discs according to some embodiments of the present invention in comparison with corrosion of conventional optical discs. The percentage of corroded area to the total disc area is the ordinate. The values were measured after the respective discs were stored in an atmosphere the temperature and relative humidity of which were 60° C. and 90%, respectively. The discs were placed in the atmosphere for 1,000 hours. Discs $A_1$–$A_5$ use adhesives each comprising a mixture of a bisphenol A epoxy resin (TB2022 available from Three Bond Co., Ltd.) and modified aliphatic polyamine (TB2131D available from Three Bond Co., Ltd.), but the viscosities of the curing agents in the respective adhesives are different. (For instance, the viscosity of the curing agent of $A_4$ is 110 cps, and that of $A_5$ is 2800 cps.) Discs $B_1$—$B_3$ use adhesives each comprising a mixture of the bisphenol A epoxy resin and a modified polyamideamine (polyamide accelerated by polyamine) curing agent, but the viscosities of the curing agents are different. Discs $C_1$–$C_3$ use adhesives each comprising a mixture of the bisphenol A epoxy resin and a polythiol curing agent, but the viscosities of the curing agents are different. Further, discs $D_1$–$D_3$ use different thermoplastic adhesives for optical disc use.

Figure 9:
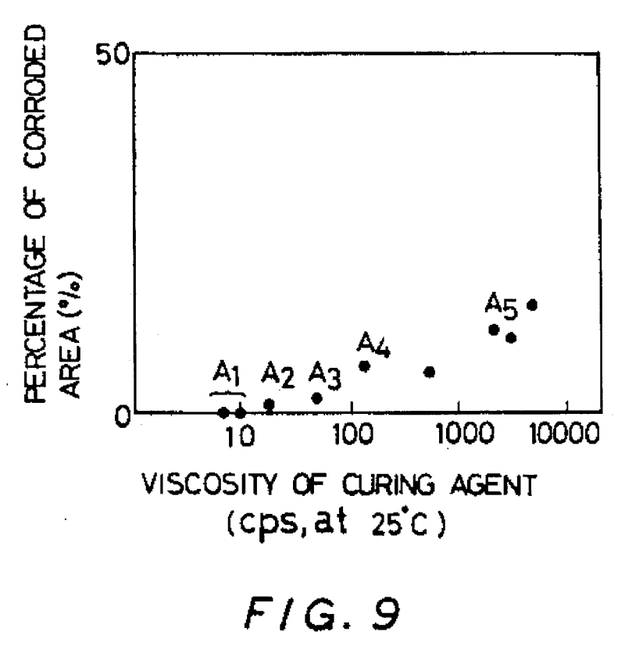
FIG. 9 shows the ratio of a corroded area of an optical disc to the total area of the disc for adhesives which use curing agents of different viscosities.

FIG. 9 shows the percentage of corroded areas of respective optical discs in which adhesives comprising a bisphenol A epoxy resin (TB2022 available from Three Bond Co., Ltd.) and modified aliphatic polyamine (TB2131D available from Three Bond Co., Ltd.) are used. The viscosities of the modified aliphatic polyamine in the respective adhesives are different. The ordinate is the percentage of corroded area, and the abscissa is the viscosity of the modified aliphatic polyamine (in cps at 25° C.). Except for the adhesives used, the optical discs shown in FIG. 9 have been made under similar conditions. As shown in FIGS. 8 and 9, the combinations of bisphenol A epoxy and modified aliphatic polyamine provide less corrosion, and those in which the viscosity of the curing agent is 100 cps (at 25° C.) or less provide much less corrosion. The disc D, (FIG. 8) has a relatively low percentage of corroded area, but it tends to have a large number of swells, as will be described later, and, therefore, is not suitable for use as an optical disc.

Figure 10:
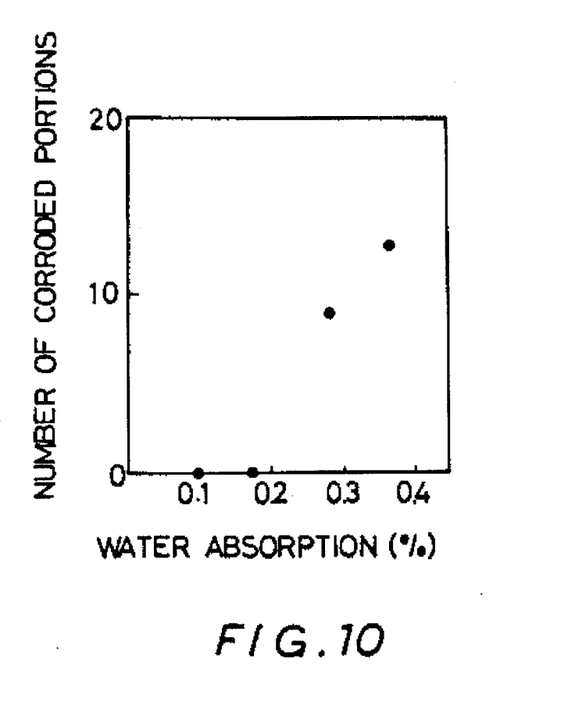
FIG. 10 shows the relationship between the number of corrosions and the water absorption of optical discs of the present invention and conventional optical discs, in which the water absorptions were measured after boiling the discs in water for one hour after the adhesive has cured.

FIG. 10 shows the number of corroded regions in optical discs which use adhesives comprising a bisphenol A epoxy resin (TB2022 available from Three Bond Co., Ltd.) and modified aliphatic polyamine (TB2131D available from Three Bond Co., Ltd.), in relation to water absorptions (%) of the adhesives after they cure. The adhesives used have different water absorptions after they have cured, which are determined after boiling them for one hour in water. The number of corroded regions were measured after storing the discs at 60° C. and at 90% RH for 1000 hours. The number of corroded regions is the ordinate, while the water absorption in percent (%) is the abscissa. As shown in FIG. 10, discs with layers of adhesives of which the water absorption after curing is 0.2% or less have no corrosion. Thus, adhesives to be used for optical discs should have a water absorption after curing of 0.2% or less.

Figure 11:
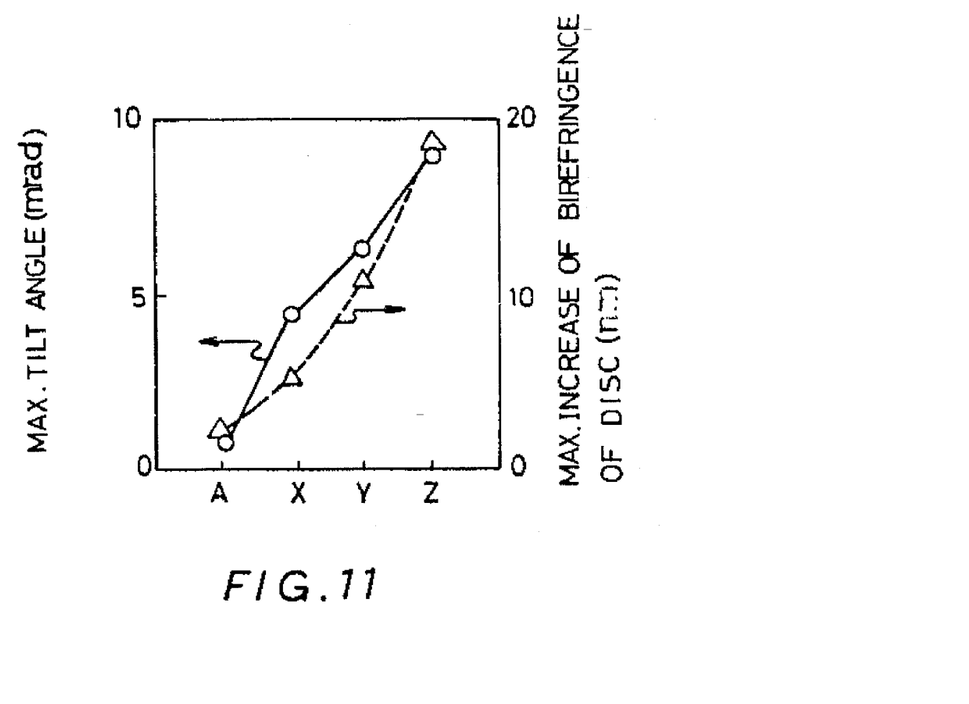
FIG. 11 shows a maximum tilt angle and a maximum amount of increase of birefringence caused by bonding, of each of optical discs of the present invention and conventional optical discs employing layers of adhesives of different curing types.

FIG. 11 shows maximum tilt angles (solid line) and maximum increases in birefringence caused by bonding (broken line), of optical discs in which adhesives of different curing types are used. In FIG. 11, (A) is a disc which uses a room-temperature curing adhesive, such as one comprising a combination of a bisphenol A epoxy resin (TB2022 available from Three Bond Co., Ltd.) and modified aliphatic polyamine (TB2131D available from Three Bond Co., Ltd.), (X) is a disc using a conventional adhesive which cures when heated to 30° C., (Y) is a disc using a conventional adhesive which cures when heated to 80° C., and (Z) is a disc using a conventional ultraviolet curing adhesive.

Figure 12:
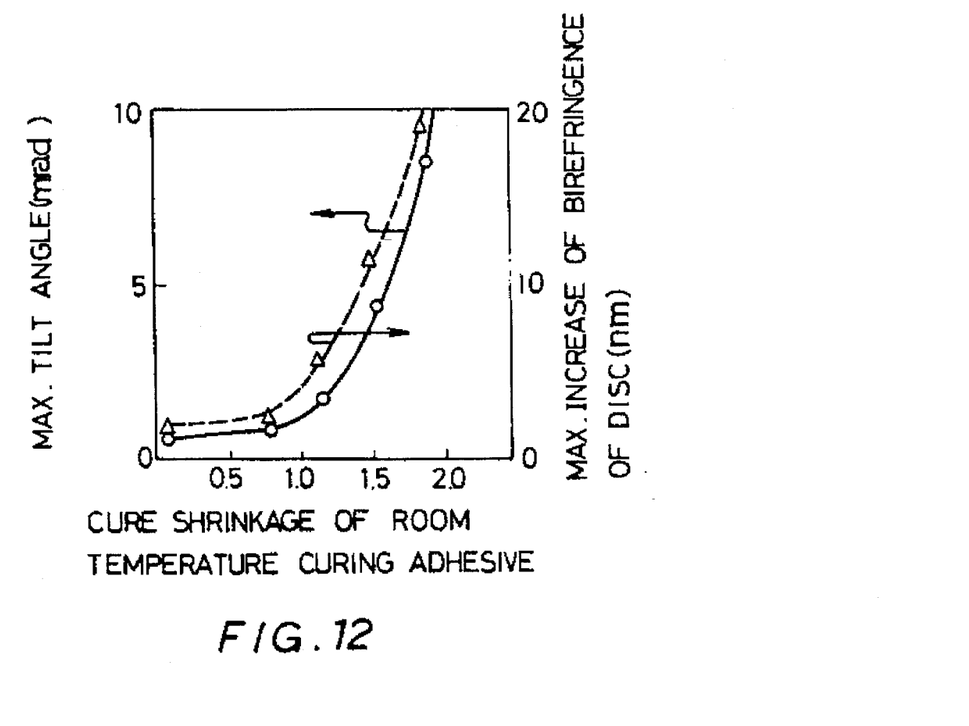
FIG. 12 shows maximum tilt angles showing maximum warpage caused by cure shrinkage of curing agents, and maximum amounts of increase of birefringence caused by bonding, of optical discs of the present invention and conventional optical discs.

FIG. 12 shows maximum tilt angles (solid line) and maximum increases in birefringence caused by bonding (broken line), on the ordinate, in relation to cure shrinkages, on the abscissa, of the optical discs using adhesives of the above-stated room-temperature curing type.

The data show that, whether the adhesive used is of the heat curing type which cures at a temperature above 30° C., of the ultraviolet curing type, or of room temperature curing type, if the cure shrinkage of the adhesive is above 1.0%, distortion after curing is too large. This produces disc deformation and/or increase of warpage and birefringence. This means that the adhesives for bonding disc units together must be curable at room temperature and have a cure shrinkage of 1.0% or less.

Figure 13:
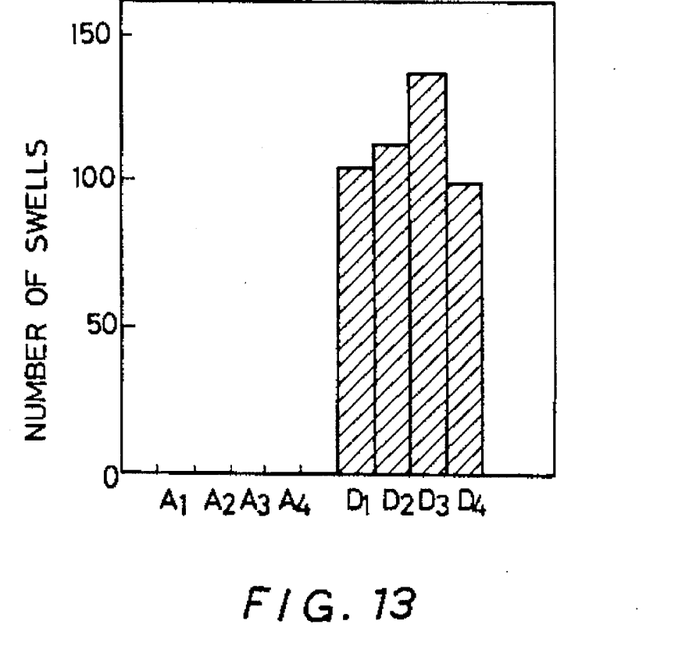
FIG. 13 shows the number of swells produced in optical discs of the present invention and conventional discs with adhesives of different curing types after thirty (30) cycles of JIS-C5024 Procedure I composite temperature/humidity cyclic tests have been performed.

FIG. 13 shows the number of swells produced in optical discs with adhesives of various curing types used for bonding disc units when the discs are subjected to 30 cycles of composite temperature/humidity cyclic tests conducted according to JIS-C5024 Procedure I. In FIG. 13, the ordinate indicates the number of swells and the abscissa indicates optical discs which employ adhesives of various curing types for their adhesive layers. $A_1$–$A_4$ represent discs using room-temperature curing epoxy resins which comprise, for example, a bisphenol A epoxy resin (TB2022 available from Three Bond Co., Ltd.) and modified aliphatic polyamine (TB2131D available from Three Bond Co., Ltd.) and have a Shore hardness of 85 (D scale). $D_1$–$D_4$ represent discs using thermoplastic adhesives applied by means of a roller. It is seen from FIG. 13 that non-uniform distribution of roller-applied thermoplastic adhesives may permit moisture to penetrate through the substrates and stay at portions between the substrates and the adhesive layer, which causes swellings to be formed in the protective films and recording layers. Such swells may cause the protective films and/or recording layers to be peeled off or to be cracked. This shows that the adhesive layers must be uniform and also have hardness of a given value or more.

Figure 14:
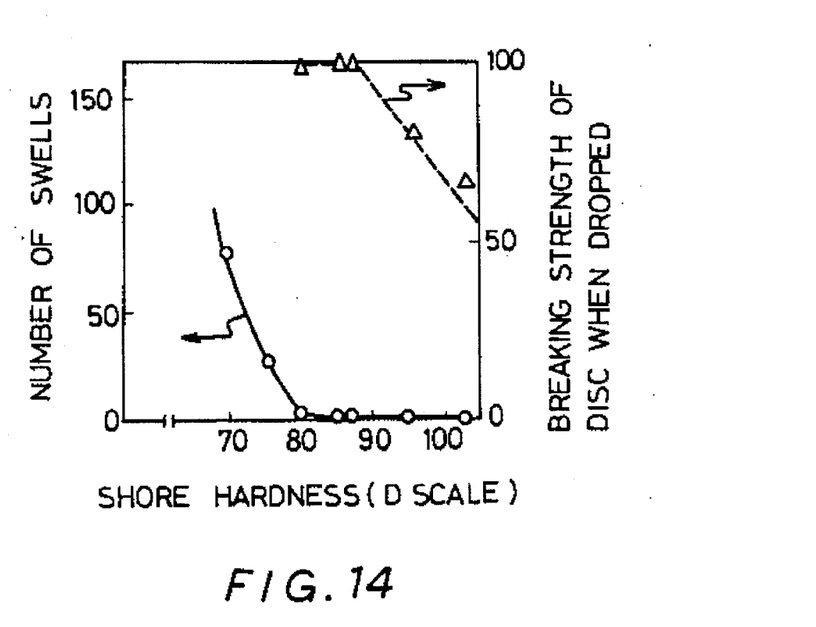
FIG. 14 shows the number of swells in optical discs of the present invention and conventional optical discs, and their breaking strength against dropping, in relation to the hardness of various adhesives of different curing types after thirty (30) cycles of JIS-C5024 Procedure I composite temperature/humidity cyclic tests have been performed.

Next, adhesives of different hardness values were tested. FIG. 14 shows the number of swells (solid line) formed in optical discs and also drop strength (broken line) of the discs after they are subjected to 30 cycles of temperature-humidity cycle tests, in relation to the Shore hardness of the adhesives. The tested discs include layers of different hardness adhesives which essentially comprises a room-temperature curing expoxy resin comprising, for example, a bisphenol A epoxy resin (TB2022 available from Three Bond Co., Ltd.) and modified aliphatic polyamine (TB2131D available from Three Bond Co., Ltd.). The drop strength is expressed in comparison with the value, which is 100, of a disc using an adhesive having a Shore hardness of 85 (D scale). As shown in FIG. 14, the number of swells in optical discs steeply decreases substantially to 0 when the Shore hardness (D scale) is above 80. However, drop tests for determining the breaking strength of discs revealed that discs using adhesives having a Shore hardness of 90 or below have substantially the same drop strength, but when a Shore hardness of the adhesive used in discs is above 90, the discs are easily broken when dropped. Accordingly, it is necessary that the adhesives have a Shore hardness (D scale) of from 80 to 90.

Figure 15:
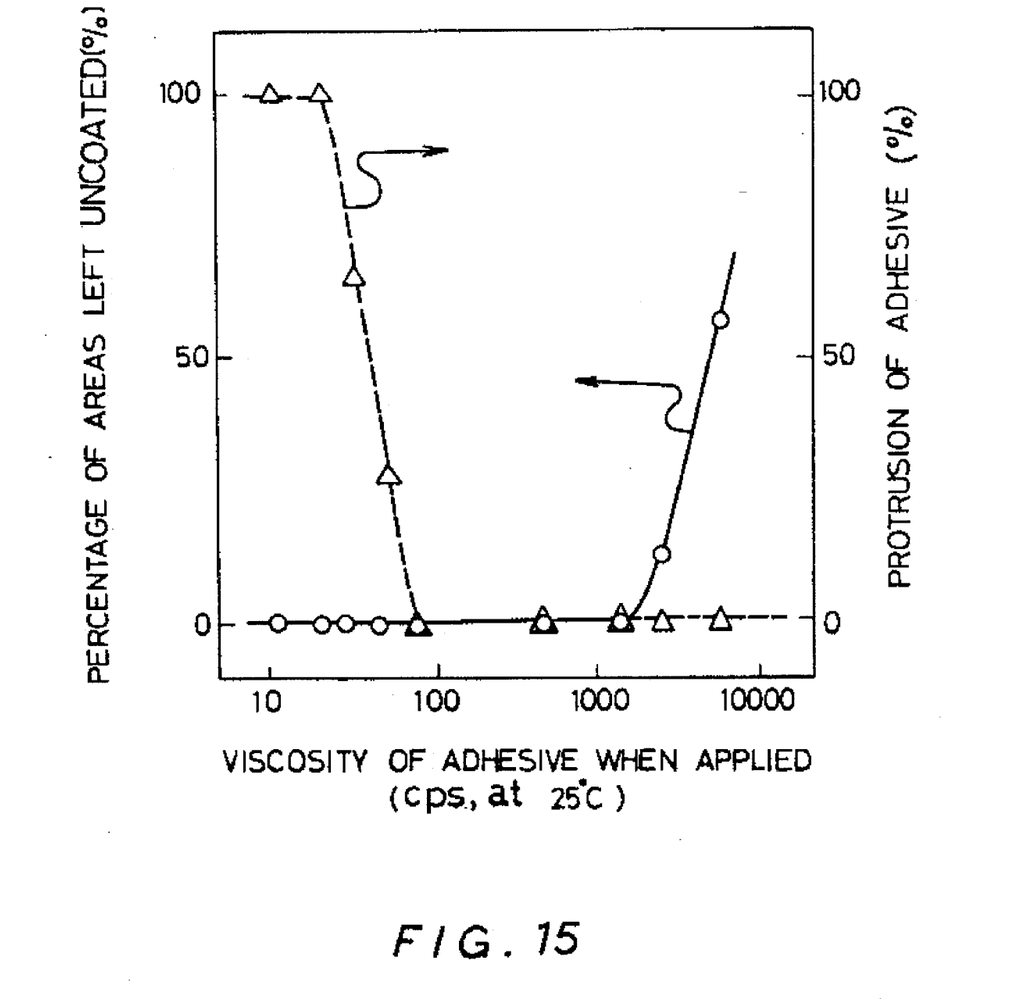
FIG. 15 shows how much area is left with no adhesive applied or how far the applied adhesive extends out of the periphery of disc center holes and out of the outer periphery of optical discs of the present invention and conventional optical discs, for various viscosities of adhesives applied with no pressure exerted to disc units.

Curing-type adhesives essentially comprising a room-temperature curing epoxy resin which comprises, for example, a bisphenol A epoxy resin (TB2022 available from Three Bond Co., Ltd.) and modified aliphatic polyamine (TB2131D available from Three Bond Co., Ltd.), and having different viscosities, were applied over disc units with no pressure applied to the adhesives. FIG. 15 shows a ratio (%) of area of portions left uncoated to the total area of discs (solid line) or a ratio (%) of the length of protrusion of adhesives out of the peripheries of the discs (broken line), in relation to the viscosity of the adhesives. Along the abscissa, the viscosity of the adhesives when they are applied over disc units is indicated in cps at 25° C. Along the ordinate, the percentage of the area of uncoated portions and the percentage of the length of adhesive protrusions are indicated. From FIG. 15, it is seen that the viscosity of adhesives to be used for bonding disc units must be from 100 cps to 1000 cps in order to form uniform adhesive layers. In the bonding step, when the viscosity of adhesives upon application to disc units is above 1000 cps, the percentage of portions left uncoated increases rapidly. On the other hand, if the viscosity is less than 100 cps, or if pressure is applied to adhesives so as to leave no uncoated portions, the adhesives will protrude from the inner periphery of the disc center hole or the outer periphery of the disc, and, therefore, the mechanical characteristics of discs are adversely affected, or an extra step for removing such protruding adhesive becomes necessary.

Further, in order to form a uniform adhesive layer free of bubbles, the pot life of adhesives should be more than one hour, since mixing, deaeration or debubble, coating and bonding steps require at least one hour in total.

Now, bearing in mind the above results the present invention is described in greater detail by means of further examples.

EXAMPLE 5

A two-pack epoxy adhesive was prepared by mixing, at room temperature, a bisphenol A epoxy resin base agent (TB2022 available from Three Bond Co., Ltd.) having a viscosity of 13,000 cps (at 25° C.) and a modified aliphatic polyamine curing agent (TB2131D available from Three Bond Co., Ltd.) having a viscosity of 10 cps, in a ratio of 3:1. The mixture was deaerated. The resultant adhesive had a vicosity of 400 cps (at 25° C.), a pot life of 5 hours, a water absorption after curing of 0.1% (after boiling in water for one hour), a cure shrinkage of 0.05%, and a Shore hardness of 85 (D scale).

Figure 16:
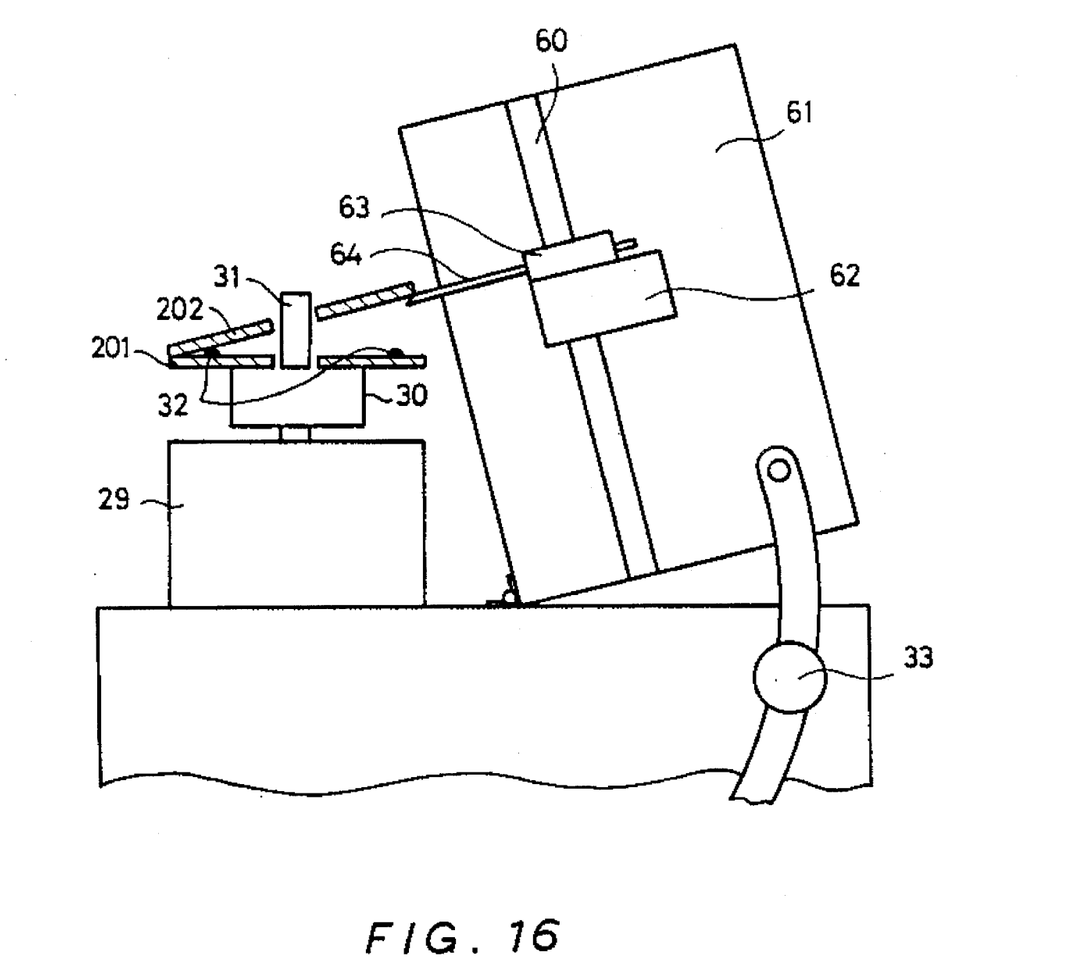
FIG. 16 shows schematically the structure of apparatus suitable for manufacturing optical discs of the present invention.

As shown in FIG. 16, in a normal pressure environment, one of highly corrosion-resistant, Tb—Fe—Co disc units 201 having a diameter of, for example, 130 mm was placed horizontally on a support 30 secured to a center shaft 31 which extended from a base 29, with the center hole in the disc unit 201 being fitted over the shaft 31. 0.5 g of the adhesive of Example 5 was applied in a circle having a radius of 40 mm on the disc unit 201. This quantity of the adhesive was to provide a thickness of from 20 to 70 microns of the adhesive layer when it cured. Then, the second disc unit 202 to be bonded to the first disc unit 201 was fitted over the center shaft 31, and only one point on the peripheral edge of the second disc unit 202 was brought into contact with one point on the periphery of the first disc unit 201. Thus, the second disc unit 202 was held slanting relative to the first unit 201. Preferably, the adhesive is applied along the circumference of a circle having a radius of from 0.5a to 0.85a from the center of the disc unit 201, where a is the radius of the disc unit 201. In the example, the adhesive was applied along the circumference of a circle having a radius of about 0.6a from the center.

A holding mechanism for the second disc unit 202 comprises a base 61 of which the slanting angle is adjusted by angle adjusting means 33, a shaft 60 attached to the base 61, drive means 62 movable up and down along the shaft 60, holding means 63 held by the drive means 62, and an extension 64 extending from the holding means 63. The slanting angle of the base 61 is adjusted so that the shaft 60 becomes substantially parallel with the line which connects points on the peripheral edges of the first and second disc units 201, 202 diametrically opposite to the aforementioned points which are in contact with each other. The tip end of the extension 64 is in engagement with the aforementioned diametrically opposite point on the outer periphery of the second disc 202 to hold the unit 202 slanted as shown. The drive means 62 is then lowered along the shaft 60 at a rate of, for example, about 1 mm/sec. so as to slowly place the second disc unit 202 on the first disc unit 201. When the second disc unit 202 has been lowered, the tip end of the extension 64 is still in engagement with the second disc unit 202, although the engagement is slight. Then, the holding means 63 is actuated to retract the extension 64 to disengage from the second disc unit 202. Then, the weight of the disc unit 202 causes the adhesive to spread over the entire space between the two disc units 201 and 202, while causing no oozing of the adhesive from the inner periphery of the center hole or from the outer periphery of the disc and also leaving no portions uncoated with the adhesive.

Figure 17:
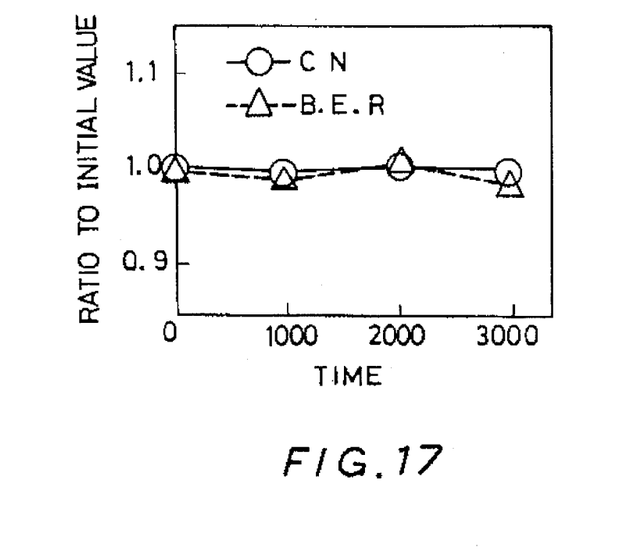
FIG. 17 shows changes, with time, in C/N ratio and bit error rate of optical discs comprising two disc units bonded together, which can be indexes of operation reliability of discs.

The disc was left at room temperature for 24 hours to cure the adhesive. The maximum tilt angle of the disc measured was 0.9 mrad, and the maximum amount of increase of the birefringence was 2.1 nm. These values show that the disc is satisfactory. This disc was left in a 60° C., 90% RH atmosphere for 3,000 hours to see how much the disc was corroded. FIG. 17 shows the results. Because no corrosion was produced, the C/N (carrier/noise) ratio did not decrease, or the B. E. R. (bit error rate) did not increase. This means that the optical disc is highly reliable.

Further, the disc was subjected to severe temperature/humidity cyclic tests to determine how the protective films and the recording layers stood up. Even after the disc was subjected to 30 cycles of the tests, no swell was formed, neither the protective films nor the recording layers peeled off, and neither the C/N nor the B. E. R. changed.

EXAMPLE 6

The same process and the same apparatus as used in Example 5 were employed for making an optical disc, but, in place of the bisphenol A epoxy base agent (TB2022 of Three Bond Co., Ltd.) used in Example 5, a bisphenol F epoxy (TB2023 available from Three Bond Co., Ltd.) was used. Tests similar to the ones conducted for the optical disc of Examples 1–5 were conducted, and similar good results were obtained.

As described above, according to the present invention, in order to bond together two disc units, each including a transparent substrate of synthetic resin and a recording layer, with the recording layers facing each other, a layer of adhesive is disposed between the facing recording layers, which adhesive is a room-temperature curing two-pack epoxy adhesive comprising a base agent of bisphenol epoxy resin and a curing agent of modified aliphatic polyamine. The adhesive has a viscosity of 100–1000 cps, and a pot life of more than one hour. After curing the adhesive layer has a cure shrinkage of 1.0% or less, a water absorption of 0.2% or less, and a Shore hardness of 80–90 (D scale). The use of such an adhesive can avoid degradation of the recording layers, deformation of the resultant optical discs, and formation of swells. Thus, products to be rejected due to undesirable bonding are reduced, and highly reliable, high quality optical discs can be manufactured.

According to an aspect of the present invention, as the curing agent of the above-described adhesive, modified aliphatic polyamine which has a viscosity of 100 cps or less is used. The use of such a curing agent can provide optical discs having, in addition to the above-described advantages, higher reliability.

Figure 18:
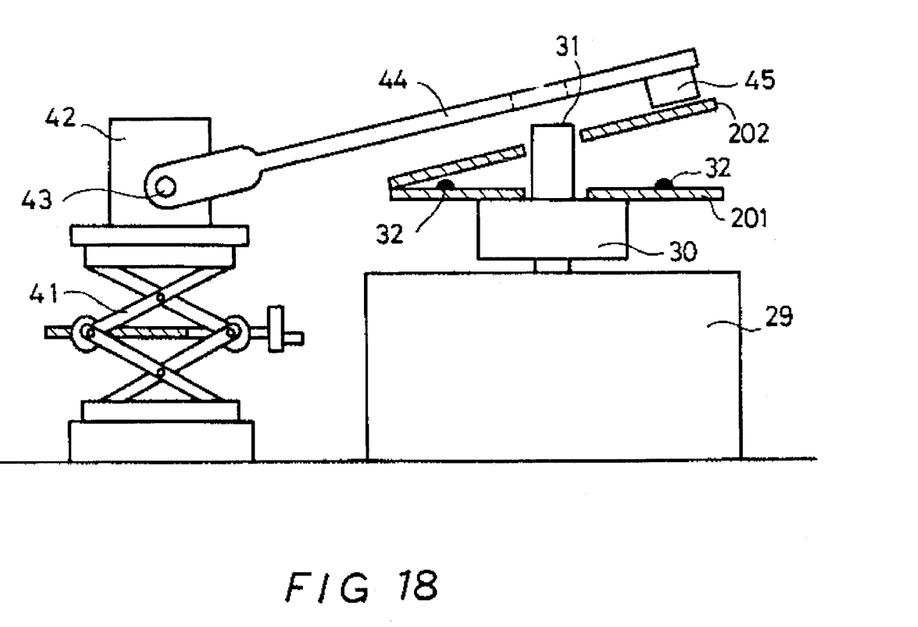
FIG. 18 shows another example of apparatus which may be used to manufacture optical discs of the present invention.

For manufacturing the optical disc of the present invention, an apparatus as shown in FIG. 18 may be used, as well. In FIG. 18, a base 29, a center shaft 31 for supporting disc units 201, 202, and a support 30 are similar to the corresponding components shown in FIG. 16, and the position on the disc unit 201 where the adhesive is to be applied is the same as in FIG. 16. In the apparatus of FIG. 18, rotation means 42 is mounted on vertical drive means 41. An arm 44 pivots about a pivot 43 on the rotation means 42. Holding means, such as suction means, 45 is attached to the tip end of the arm 44 to hold the disc unit 202 slanting as shown.

Under a normal pressure condition, the first disc unit 201 having a diameter of, for example, 130 mm is placed horizontal on the support 30 with the center shaft 31 extending through the center hole in the disc unit 201. Then, 0.5 g of the adhesive 32 is applied onto the disc unit 201 along the circumference of a circle having a diameter of about 40 mm. The second disc unit 202 is then place in the apparatus, with the center shaft 31 extending through the center hole of the disc unit 202. In this case, one point on the outer periphery of the disc unit 202 is brought into contact with the corresponding point of the first disc unit 201. The second disc unit 202 is held by the suction means 45 at the portion diametrically opposite to that one point. Thus, the second disc unit 202 is held slanting as shown. In this case, the vertical position of the drive means 41 and the angle of the arm 44 are so adjusted that the arm 44 is in parallel with the surface of the second disc unit 202.

Then, the rotation means 42 is activated so as to cause the arm 44 to pivot in such a manner that the tip end of the arm 44 is lowered at a rate of, for example, 1 mm/sec. Thus, the second disc unit 202 is placed on the first disc unit 201. Seeing that the adhesive is spread over the entire space between the two disc units by the weight of the second disc unit 202, the adhesive 32 is cured at room temperature. In place of the illustrated jack-type device, any other types of drive means 41 can be used.

What is claimed is:

1. An optical disc unit comprising: a first disk unit having a first facing surface, a second disk unit having a second facing surface, said first and second facing surfaces facing each other, at least one of said first and second facing surfaces including a recording layer, a layer of adhesive disposed between said first and second facing surfaces, said adhesive including a thermosetting resin, said thermosetting resin having a glass transition temperature that is higher than 60° C., and said thermosetting resin being of a type that cures at room temperature.

2. An optical disc comprising: two disc units, each of said disc units including a transparent substrate and a recording layer on one surface of said substrate, said recording layers facing each other, a layer of an adhesive between said facing recording layers, said adhesive including a thermosetting resin; said thermosetting resin having a glass transition temperature that is higher than 60° C.; said adhesive being further a room-temperature curing two-pack epoxy adhesive comprising a bisphenol epoxy resin as a base agent and a modified aliphatic polyamine as a curing agent, said adhesive having a viscosity of from 100 to 1000 cps, a pot life of more than one hour, and a cure shrinkage of 1.0% or less, and said adhesive, after curing, having a water absorption of 0.2% or less and a Shore hardness of 80–90.

3. An optical disc according to claim 2 wherein the bisphenol epoxy resin is a bisphenol A epoxy resin.

4. An optical disc according to claim 2 wherein the bisphenol epoxy resin is a bisphenol F epoxy resin.

5. An optical disc comprising: two disc units, each of said disc units including a transparent substrate and a recording layer on one surface of said substrate, said recording layers of said two disc units facing each other; a layer of adhesive between said facing recording layers, said adhesive including a thermosetting resin; said thermosetting resin having a glass transition temperature that is higher than 60° C.; said adhesive being further a room-temperature curing two-pack epoxy adhesive comprising a bisphenol epoxy resin as a base agent and a modified aliphatic polyamine having a viscosity of 100 cps or less as a curing agent, said adhesive having a viscosity of from 100 to 1000 cps, a pot life of more than one hour and a cure shrinkage of 1.0% or less, and said adhesive, after curing, having a water absorption of 0.2% or less and a Shore hardness of 80–90.

6. An optical disc according to claim 5 wherein the bisphenol epoxy resin is a bisphenol A epoxy resin.

7. An optical disc according to claim 5 wherein the bisphenol epoxy resin is a bisphenol F epoxy resin.

\* \* \* \* \*